(12) United States Patent
Qi et al.

(10) Patent No.: US 9,383,989 B1
(45) Date of Patent: Jul. 5, 2016

(54) SYSTEMS AND METHODS FOR UPDATING APPLICATIONS

(71) Applicant: Symantec Corporation, Mountain View, CA (US)

(72) Inventors: Zeqing Qi, Beijing (CN); Yueguang Jiao, Beijing (CN); Chao Lei, Beijing (CN); Olvan Deng, Beijing (CN)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/305,497

(22) Filed: Jun. 16, 2014

(51) Int. Cl.
*G06F 9/44* (2006.01)
*G06F 9/445* (2006.01)

(52) U.S. Cl.
CPC .. *G06F 8/65* (2013.01); *G06F 8/68* (2013.01); *G06F 8/61* (2013.01); *G06F 8/71* (2013.01)

(58) Field of Classification Search
CPC ....... G06F 8/61–8/65; G06F 8/71; G06F 8/68
See application file for complete search history.

(56) References Cited

U.S. PATENT DOCUMENTS

| | | | |
|---|---|---|---|
| 7,076,496 B1 * | 7/2006 | Ruizandrade | G06F 8/71 707/695 |
| 8,701,144 B2 | 4/2014 | Shin et al. | |
| 8,705,050 B2 | 4/2014 | Sinha | |
| 8,705,401 B1 | 4/2014 | Croak et al. | |
| 8,706,177 B2 | 4/2014 | Norris et al. | |
| 8,706,576 B1 | 4/2014 | Balasubramaniam et al. | |
| 8,706,800 B1 | 4/2014 | Ahmed et al. | |
| 8,706,921 B2 | 4/2014 | Zadigian et al. | |
| 8,707,297 B2 | 4/2014 | Brown et al. | |
| 8,711,704 B2 | 4/2014 | Werb et al. | |
| 8,712,968 B1 | 4/2014 | Chester et al. | |
| 8,712,970 B1 | 4/2014 | Sim-Tang | |
| 8,713,137 B2 | 4/2014 | Ji et al. | |
| 8,713,147 B2 | 4/2014 | Ferris et al. | |
| 8,713,201 B2 | 4/2014 | Smith et al. | |
| 8,713,295 B2 | 4/2014 | Bax et al. | |
| 8,713,616 B2 | 4/2014 | Kim et al. | |
| 8,713,674 B1 | 4/2014 | Geide | |
| 8,717,443 B2 | 5/2014 | Kaehler et al. | |

(Continued)

OTHER PUBLICATIONS

Gianlorenzo D' Angelo, Partially Dynamic Concurrent Update of Distributed Shortest Paths, 2007, pp. 1-7.*

(Continued)

*Primary Examiner* — Thuy Dao
*Assistant Examiner* — Mongbao Nguyen
(74) *Attorney, Agent, or Firm* — ALG Intellectual Property, LLC

(57) ABSTRACT

The disclosed computer-implemented method for updating applications may include (1) identifying each version of an application, (2) determining possible upgrade paths to upgrade the application from an initial version of the application to a desired version of the application by, for each version of the application (a) creating a connection between the version and each subsequent version to which the version can be upgraded and (b) weighting each connection with a success rate that indicates the probability that the version will be successfully upgraded to the subsequent version, and (3) identifying, from among the possible upgrade paths, an optimal upgrade path for upgrading the application from the initial version to the desired version based on an analysis of both the combined weight and the combined length of the connections within each possible upgrade path. Various other methods, systems, and computer-readable media are also disclosed.

17 Claims, 8 Drawing Sheets

(56) References Cited

U.S. PATENT DOCUMENTS

| | | | |
|---|---|---|---|
| 8,718,620 B2 | 5/2014 | Rosenblatt |
| 8,719,339 B2 | 5/2014 | Reisman |
| 8,719,413 B1 | 5/2014 | Sasso et al. |
| 8,719,559 B2 | 5/2014 | Aloni et al. |
| 8,719,809 B2 | 5/2014 | Gokhale |
| 8,719,810 B2 | 5/2014 | Oh |
| 8,721,448 B2 | 5/2014 | Crowder, Jr. et al. |
| 8,723,667 B2 | 5/2014 | White, II |
| 8,724,489 B2 | 5/2014 | Rinne et al. |
| 8,724,605 B2 | 5/2014 | Zhang et al. |
| 8,724,612 B2 | 5/2014 | Al-Khudairi |
| 8,725,063 B2 | 5/2014 | Krampf et al. |
| 8,725,081 B2 | 5/2014 | Kantzes et al. |
| 8,725,126 B2 | 5/2014 | Ramer et al. |
| 8,725,507 B2 | 5/2014 | Cortez et al. |
| 8,725,610 B1 | 5/2014 | Wookey et al. |
| 8,725,663 B1 | 5/2014 | Triantaphyllou et al. |
| 8,726,149 B2 | 5/2014 | Bendelac et al. |
| 8,726,259 B2 | 5/2014 | Juneja |
| 8,726,266 B2 | 5/2014 | Kiaie et al. |
| 8,726,267 B2 | 5/2014 | Li et al. |
| 8,726,303 B2 | 5/2014 | Ellis, III |
| 8,726,374 B2 | 5/2014 | Unagami et al. |
| 8,727,604 B2 | 5/2014 | Compton et al. |
| 8,727,886 B2 | 5/2014 | McTernan et al. |
| 8,729,857 B2 | 5/2014 | Stahlin et al. |
| 8,730,502 B2 | 5/2014 | Burke, Jr. |
| 8,731,211 B2 | 5/2014 | Burnett |
| 8,731,773 B2 | 5/2014 | Yousefi et al. |
| 8,732,023 B2 | 5/2014 | Mikurak |
| 8,732,031 B2 | 5/2014 | Martin et al. |
| 8,732,230 B2 | 5/2014 | Ellis, III |
| 8,732,238 B2 | 5/2014 | Steakley |
| 8,732,324 B2 | 5/2014 | Weis |
| 8,732,484 B2 | 5/2014 | Segawa |
| 8,732,677 B2 | 5/2014 | Bohle |
| 8,732,693 B2 | 5/2014 | Mutisya et al. |
| 8,732,850 B2 | 5/2014 | Gudenus et al. |
| 8,734,259 B2 | 5/2014 | Evans et al. |
| 8,734,718 B2 | 5/2014 | Dacey, Jr. et al. |
| 8,736,482 B2 | 5/2014 | Wu et al. |
| 8,737,379 B2 | 5/2014 | Gresset et al. |
| 8,737,798 B2 | 5/2014 | Dodd |
| 8,737,972 B2 | 5/2014 | Ramer et al. |
| 8,738,004 B2 | 5/2014 | Amirijoo et al. |
| 8,738,094 B2 | 5/2014 | Velusamy et al. |
| 8,738,708 B2 | 5/2014 | Chasin |
| 8,738,751 B2 | 5/2014 | Long et al. |
| 8,738,775 B1 | 5/2014 | Adogla et al. |
| 8,738,966 B2 | 5/2014 | Hopper |
| 8,739,059 B2 | 5/2014 | Rabenold et al. |
| 8,739,128 B1 | 5/2014 | Cohen et al. |
| 8,739,149 B2 | 5/2014 | Tackett et al. |
| 8,739,151 B1 | 5/2014 | Racz et al. |
| 8,739,153 B2 | 5/2014 | Keys et al. |
| 8,739,155 B2 | 5/2014 | Hehir et al. |
| 8,739,195 B2 | 5/2014 | Ellis, III |
| 8,739,288 B2 | 5/2014 | Diamant et al. |
| 8,739,308 B1 | 5/2014 | Roth et al. |
| 8,742,926 B2 | 6/2014 | Schnittman et al. |
| 8,743,741 B2 | 6/2014 | Mueller et al. |
| 8,743,856 B2 | 6/2014 | Lee et al. |
| 8,743,878 B2 | 6/2014 | Gavrilov |
| 8,744,087 B2 | 6/2014 | Bodley et al. |
| 8,744,860 B2 | 6/2014 | Chang et al. |
| 8,744,898 B1 | 6/2014 | Hewett et al. |
| 8,745,153 B2 | 6/2014 | Gharabally et al. |
| 8,745,154 B1 | 6/2014 | Froment et al. |
| 8,745,191 B2 | 6/2014 | Raleigh et al. |
| 8,745,213 B2 | 6/2014 | Dare et al. |
| 8,745,220 B2 | 6/2014 | Raleigh et al. |
| 8,745,225 B2 | 6/2014 | Erman et al. |
| 8,745,610 B2 | 6/2014 | Sasaki |
| 8,745,611 B2 | 6/2014 | Saraf et al. |
| 8,745,613 B2 | 6/2014 | Bambach et al. |
| 8,745,636 B2 | 6/2014 | Quintanilla et al. |
| 8,745,735 B2 | 6/2014 | Maeda et al. |
| 2002/0144254 A1* | 10/2002 | Owada ............... G06F 8/68 717/171 |
| 2005/0132350 A1* | 6/2005 | Markley ............... G06F 8/65 717/168 |
| 2005/0193382 A1* | 9/2005 | Goring ............... G06F 8/65 717/162 |
| 2006/0200814 A1* | 9/2006 | Kontinen ............... G06F 8/61 717/168 |
| 2007/0061800 A1* | 3/2007 | Cheng ............... G06F 8/65 717/170 |
| 2008/0005732 A1* | 1/2008 | Coon ............... G06F 8/65 717/168 |
| 2009/0150878 A1* | 6/2009 | Pathak ............... G06F 8/65 717/172 |
| 2010/0082847 A1* | 4/2010 | Yasui ............... 710/15 |
| 2012/0210312 A1* | 8/2012 | Ma ............... G06F 11/1433 717/170 |
| 2013/0139139 A1* | 5/2013 | Mallur ............... G06F 8/65 717/170 |
| 2014/0013318 A1* | 1/2014 | Rychikhin ............... 717/172 |
| 2014/0155173 A1 | 6/2014 | Petersen et al. |
| 2014/0155705 A1 | 6/2014 | Papadopoulos et al. |
| 2014/0155708 A1 | 6/2014 | Petersen et al. |
| 2014/0155715 A1 | 6/2014 | Chen et al. |
| 2014/0155771 A1 | 6/2014 | Quick et al. |
| 2014/0156025 A1 | 6/2014 | Bisbee, III et al. |
| 2014/0156081 A1 | 6/2014 | Ha |
| 2014/0156082 A1 | 6/2014 | Ha |
| 2014/0156317 A1 | 6/2014 | Eijdenberg et al. |
| 2014/0156343 A1 | 6/2014 | Olsen et al. |
| 2014/0156360 A1 | 6/2014 | Shalita et al. |
| 2014/0156372 A1 | 6/2014 | Postrel |
| 2014/0156374 A1 | 6/2014 | Henry, Jr. et al. |
| 2014/0156437 A1 | 6/2014 | Baran et al. |
| 2014/0156500 A1 | 6/2014 | Lassen et al. |
| 2014/0156503 A1 | 6/2014 | Lassen et al. |
| 2014/0156515 A1 | 6/2014 | Bailey, Jr. |
| 2014/0156540 A1 | 6/2014 | Williams et al. |
| 2014/0156542 A1 | 6/2014 | McKeown |
| 2014/0156641 A1 | 6/2014 | Tripoli et al. |
| 2014/0156710 A1 | 6/2014 | VanGompel |
| 2014/0156742 A1 | 6/2014 | Liu et al. |
| 2014/0156783 A1 | 6/2014 | Matthews et al. |
| 2014/0156784 A1 | 6/2014 | Buck |
| 2014/0156806 A1 | 6/2014 | Karpistsenko et al. |
| 2014/0156824 A1 | 6/2014 | Biswas et al. |
| 2014/0156836 A1 | 6/2014 | Demmer et al. |
| 2014/0156851 A1 | 6/2014 | Suami et al. |
| 2014/0156869 A1 | 6/2014 | Smith et al. |
| 2014/0156883 A1 | 6/2014 | Bowles |
| 2014/0156927 A1 | 6/2014 | Mori et al. |
| 2014/0156953 A1 | 6/2014 | Adl-Tabatabai et al. |
| 2014/0156992 A1 | 6/2014 | Medin et al. |
| 2014/0157099 A1 | 6/2014 | Abdukalykov et al. |
| 2014/0157127 A1 | 6/2014 | Erickson, Jr. et al. |
| 2014/0157231 A1 | 6/2014 | Cai et al. |
| 2014/0157244 A1 | 6/2014 | Windley et al. |
| 2014/0157250 A1 | 6/2014 | Weckwerth et al. |
| 2014/0157251 A1 | 6/2014 | Hocker et al. |
| 2014/0157252 A1 | 6/2014 | Weckwerth et al. |
| 2014/0157253 A1 | 6/2014 | Padhy et al. |
| 2014/0157255 A1 | 6/2014 | Chan et al. |
| 2014/0157256 A1 | 6/2014 | Marshall et al. |
| 2014/0157264 A1 | 6/2014 | Russinovich et al. |
| 2014/0157270 A1 | 6/2014 | DeLuca et al. |
| 2014/0157273 A1 | 6/2014 | Axnix et al. |
| 2014/0157274 A1 | 6/2014 | Ballani |
| 2014/0157279 A1 | 6/2014 | Horikawa |
| 2014/0157280 A1 | 6/2014 | Yamauchi et al. |
| 2014/0157283 A1 | 6/2014 | Maclinovsky et al. |
| 2014/0157295 A1 | 6/2014 | Jagtiani et al. |
| 2014/0157297 A1 | 6/2014 | Chao et al. |
| 2014/0157298 A1 | 6/2014 | Murphy |
| 2014/0157299 A1 | 6/2014 | Alcala et al. |
| 2014/0157304 A1 | 6/2014 | Fay et al. |
| 2014/0157306 A1 | 6/2014 | Deo et al. |
| 2014/0157309 A1 | 6/2014 | Small et al. |

(56) References Cited

U.S. PATENT DOCUMENTS

| | | |
|---|---|---|
| 2014/0157322 A1 | 6/2014 | Corl |
| 2014/0157324 A1 | 6/2014 | Mao et al. |
| 2014/0157335 A1 | 6/2014 | Hicks, III et al. |
| 2014/0157336 A1 | 6/2014 | Deegan et al. |
| 2014/0157341 A1 | 6/2014 | Malin et al. |
| 2014/0157352 A1 | 6/2014 | Paek et al. |
| 2014/0157355 A1 | 6/2014 | Clancy, III et al. |
| 2014/0157365 A1 | 6/2014 | Janakiraman et al. |
| 2014/0157369 A1 | 6/2014 | Mischook et al. |
| 2014/0157370 A1 | 6/2014 | Plattner et al. |
| 2014/0157372 A1 | 6/2014 | Shimizu |
| 2014/0157374 A1 | 6/2014 | Kato et al. |
| 2014/0157376 A1 | 6/2014 | Nambiar et al. |
| 2014/0157379 A1 | 6/2014 | Murarka |
| 2014/0157380 A1 | 6/2014 | Abrams et al. |
| 2014/0157381 A1 | 6/2014 | Disraeli |
| 2014/0157384 A1 | 6/2014 | Stern et al. |
| 2014/0157387 A1 | 6/2014 | Lee et al. |
| 2014/0157390 A1 | 6/2014 | Lurey et al. |
| 2014/0157393 A1 | 6/2014 | Whitcomb |
| 2014/0157397 A1 | 6/2014 | Dalal et al. |
| 2014/0157398 A1 | 6/2014 | McKinney |
| 2014/0157405 A1 | 6/2014 | Joll et al. |
| 2014/0157407 A1 | 6/2014 | Krishnan et al. |
| 2014/0157408 A1 | 6/2014 | Mei et al. |
| 2014/0157410 A1 | 6/2014 | Dewan et al. |
| 2014/0157416 A1 | 6/2014 | Holloway et al. |
| 2014/0157417 A1 | 6/2014 | Grubel et al. |
| 2014/0157422 A1 | 6/2014 | Livshits et al. |
| 2014/0157438 A1 | 6/2014 | Seleznev et al. |
| 2014/0185531 A1* | 7/2014 | Liu et al. ........................ 370/329 |
| 2014/0196020 A1* | 7/2014 | Shetty ........................ G06F 8/68 717/171 |
| 2014/0201726 A1* | 7/2014 | Asselin ........................ G06F 8/71 717/170 |
| 2014/0208304 A1* | 7/2014 | Subramanya et al. ........ 717/170 |
| 2014/0304697 A1* | 10/2014 | Lin ........................ G06F 8/68 717/170 |
| 2014/0337825 A1* | 11/2014 | Challa ........................ G06F 8/65 717/168 |
| 2015/0020061 A1* | 1/2015 | Ravi ........................ G06F 8/65 717/172 |

OTHER PUBLICATIONS

Sushant S. Khopkar, An Efficient Map-Reduce Algorithm for the Incremental Computation of All-Pairs Shortest Paths in Social Networks, 2012, pp. 1-5.*

Jianfeng Yan, Support Multi-version Applications in SaaS via Progressive Schema Evolution, 2009, pp. 1-8.*

Sourabh Satish, et al; Systems and Methods for Replicating Computing System Environments; U.S. Appl. No. 14/269,145, filed May 4, 2014.

"Shortest path problem", http://en.wikipedia.org/wiki/Shortest_path_problem, as accessed Apr. 21, 2014, Wikipedia, (Dec. 29, 2003).

"Longest path problem", http://en.wikipedia.org/wiki/Longest_path_problem, as accessed Apr. 21, 2014, Wikipedia, (Apr. 26, 2009).

* cited by examiner

| Upgrade Path Summaries 600 | | | |
|---|---|---|---|
| Upgrade Path | Path Steps | Path Length | Path Success Rate |
| 1 | A → H | 1 | .55 |
| 2 | A → E → F → H | 3 | .65 |
| 3 | A → E → F → G → H | 4 | .68 |

*FIG. 6*

SYSTEMS AND METHODS FOR UPDATING APPLICATIONS

BACKGROUND

In order to improve the security and/or quality of an application, software developers may create and distribute upgraded versions of the application. Each version of the application often contains and/or supports different features and elements of the application. In some cases, users of the application may wish to upgrade their current version of the application to an improved version.

Unfortunately, in some circumstances, a user may be unable to directly (i.e., in one step) and successfully upgrade their application to a desired version. For example, if an application has many different versions, some versions may not support upgrades to one or more other versions. In addition, some attempts to upgrade an application to a higher version may fail and/or result in a nonfunctional or ineffective application. As such, the current disclosure identifies and addresses a need for more efficient and effective systems and methods for updating applications.

SUMMARY

As will be described in greater detail below, the instant disclosure describes various systems and methods for updating applications by determining the optimal sequence of upgrades to apply to an application in order to efficiently and successfully upgrade the application to a desired version.

In one example, a computer-implemented method for updating applications may include (1) identifying each version of an application, (2) determining possible upgrade paths to upgrade the application from an initial version of the application to a desired version of the application by, for each version of the application (a) creating a connection between the version and each subsequent version to which the version can be upgraded and (b) weighting each connection with a success rate that indicates the probability that the version will be successfully upgraded to the subsequent version, and (3) identifying, from among the possible upgrade paths, an optimal upgrade path for upgrading the application from the initial version to the desired version based on an analysis of both the combined weight and the combined length of the connections within each possible upgrade path. In some embodiments, the method may further include using the optimal upgrade path to upgrade the application from the initial version to the desired version.

In some examples, the success rate for each connection may be obtained by receiving historical data that indicates the success of an attempt to perform the upgrade on at least one additional computing device. In these examples, receiving the historical data may include triggering the additional computing device to send the historical data in response to detecting the upgrade.

In some embodiments, the combined length of each possible upgrade path may be calculated by identifying the number of connections within the possible upgrade path. In addition, the combined weight of each possible upgrade may be calculated by accumulating the success rate of each connection within the possible upgrade path. In such embodiments, accumulating the success rate of each connection may include multiplying the probabilities used to weight each connection and/or summing logarithms of the probabilities used to weight each connection.

In some examples, identifying the optimal upgrade path may include identifying a possible upgrade path with the largest combined weight. In other examples, identifying the optimal upgrade path may include identifying a possible upgrade path with the shortest combined length. Additionally or alternatively, identifying the optimal upgrade path may include analyzing the possible upgrade paths using a shortest-path algorithm.

In one embodiment, a system for implementing the above-described method may include (1) an identification module that identifies each version of an application, (2) a determination module that determines possible upgrade paths to upgrade the application from an initial version of the application to a desired version of the application by, for each version of the application (a) creating a connection between the version and each subsequent version to which the version can be upgraded and (b) weighting each connection with a success rate that indicates the probability that the version will be successfully upgraded to the subsequent version, and (3) an analysis module that identifies, from among the possible upgrade paths, an optimal upgrade path for upgrading the application from the initial version to the desired version based on an analysis of both the combined weight and the combined length of the connections within each possible upgrade path. In addition, the system may include at least one processor that executes the identification module, the determination module, and the analysis module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify each version of an application, (2) determine possible upgrade paths to upgrade the application from an initial version of the application to a desired version of the application by, for each version of the application (a) creating a connection between the version and each subsequent version to which the version can be upgraded and (b) weighting each connection with a success rate that indicates the probability that the version will be successfully upgraded to the subsequent version, and (3) identify, from among the possible upgrade paths, an optimal upgrade path for upgrading the application from the initial version to the desired version based on an analysis of both the combined weight and the combined length of the connections within each possible upgrade path.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 6 is an illustration of the success rates of possible upgrade paths.

Figure 1:
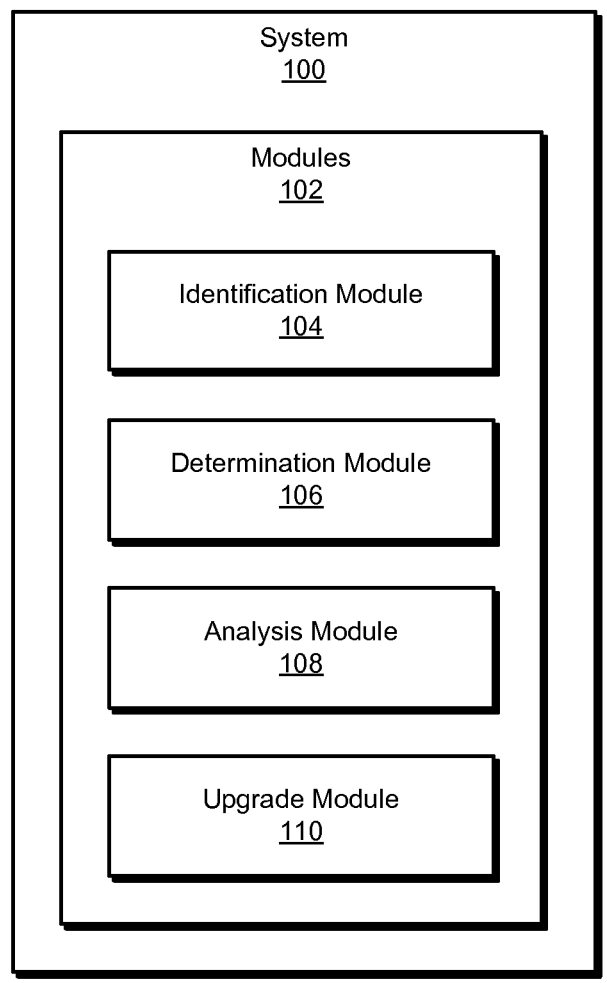
FIG. 1 is a block diagram of an exemplary system for updating applications.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for updating applications. As will be explained in greater detail below, by determining the probability of successfully updating versions of an application to subsequent versions, the disclosed systems and methods may identify possible upgrade paths to upgrade an initial version of an application to a desired version. In addition, by analyzing both the total weight and total length of each upgrade path, the described systems and methods may identify an optimal upgrade path that efficiently and successfully upgrades the initial version to the desired version.

The following will provide, with reference to FIGS. 1-2 and 4-6, detailed descriptions of exemplary systems for updating applications. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 7 and 8, respectively.

FIG. 1 is a block diagram of an exemplary system 100 for updating applications. As illustrated in this figure, exemplary system 100 may include one or more modules 102 for performing one or more tasks. For example, and as will be explained in greater detail below, exemplary system 100 may include an identification module 104 that identifies each version of an application. Exemplary system 100 may also include a determination module 106 that determines possible upgrade paths to upgrade the application from an initial version of the application to a desired version of the application by, for each version of the application (1) creating a connection between the version and each subsequent version to which the version can be upgraded and (2) weighting each connection with a success rate that indicates the probability that the version will be successfully upgraded to the subsequent version.

In addition, and as will be described in greater detail below, exemplary system 100 may include an analysis module 108 that identifies, from among the possible upgrade paths, an optimal upgrade path for upgrading the application from the initial version to the desired version based on an analysis of both the combined weight and the combined length of the connections within each possible upgrade path. Furthermore, exemplary system 100 may include an upgrade module 110 that, in response to identifying the optimal upgrade path, uses the optimal upgrade path to upgrade the application from the initial version to the desired version. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing devices 202(1)-(N) and/or server 206), computing system 710 in FIG. 7, and/or portions of exemplary network architecture 800 in FIG. 8. One or more of modules 102 in FIG. 1 may also represent all or portions of one or more special-purpose computers configured to perform one or more tasks.

Figure 2:
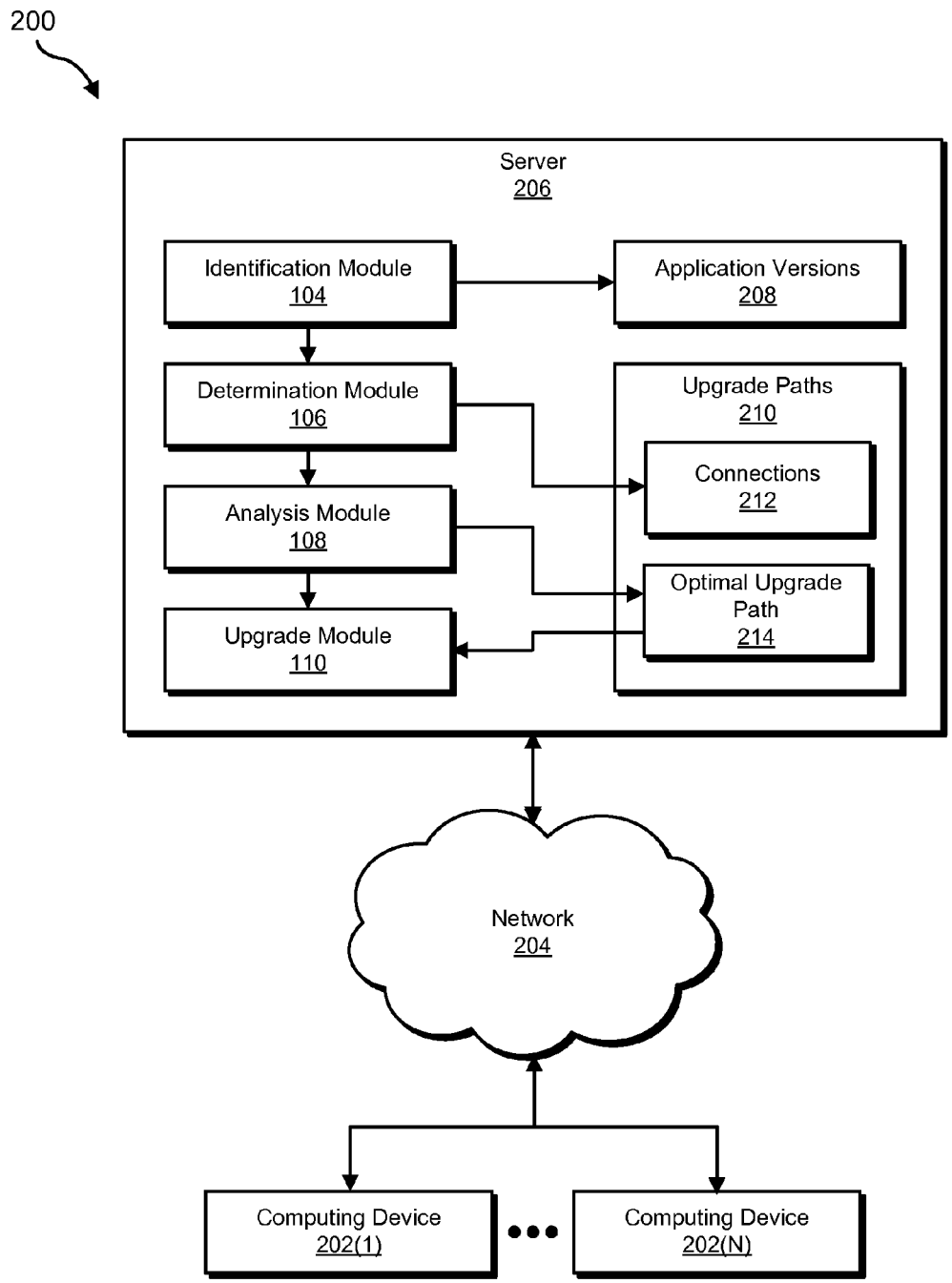
FIG. 2 is a block diagram of an additional exemplary system for updating applications.

Exemplary system 100 in FIG. 1 may be implemented in a variety of ways. For example, all or a portion of exemplary system 100 may represent portions of exemplary system 200 in FIG. 2. As shown in FIG. 2, system 200 may include computing devices 202(1)-(N) in communication with a server 206 via a network 204. In one example, computing devices 202(1)-(N) may be programmed with one or more of modules 102 in order to detect and analyze the success of upgrades applied to applications installed on one or more of computing devices 202(1)-(N). Additionally or alternatively, server 206 may be programmed with one or more of modules 102 in order to identify optimal upgrade paths for upgrading applications installed on computing devices 202(1)-(N).

In one embodiment, one or more of modules 102 from FIG. 1 may, when executed by at least one processor of computing devices 202(1)-(N) and/or server 206, enable one or more of computing devices 202(1)-(N) and/or server 206 to upgrade applications. For example, and as will be described in greater detail below, identification module 104 may cause computing devices 202(1)-(N) and/or server 206 to identify each version of an application (e.g., application versions 208). Next, determination module 106 may cause computing devices 202(1)-(N) and/or server 206 to determine possible upgrade paths (e.g., upgrade paths 210) to upgrade the application from an initial version of the application to a desired version of the application by, for each version of the application (1) creating a connection (e.g., one of connections 212) between the version and each subsequent version to the which the application can be upgraded and (2) weighting each connection with a success rate that indicates the probability that the version will be successfully upgraded to the subsequent version. Finally, analysis module 108 may cause computing devices 202(1)-(N) and/or server 206 to identify, from among the possible upgrade paths, an optimal upgrade path (e.g., optimal upgrade path 214) for upgrading the application from the initial version to the desired version based on an analysis of both the combined weight and the combined length of the connections within each possible upgrade path.

Computing devices 202(1)-(N) generally represent any type or form of computing device capable of reading computer-executable instructions. In some examples, one or more of computing devices 202(1)-(N) may attempt to upgrade an initial version of an application installed on the computing device to a desired version of the application. Examples of computing devices 202(1)-(N) include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 710 in FIG. 7, or any other suitable computing device.

Server 206 generally represents any type or form of computing device that is capable of identifying and analyzing connections between versions of an application. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 800 in FIG. 8, or the like. Network 204 may facilitate communication or data transfer using wireless or wired connections. In one embodiment, network 204 may facilitate communication between computing devices 202(1)-(N) and server 206.

Figure 3:
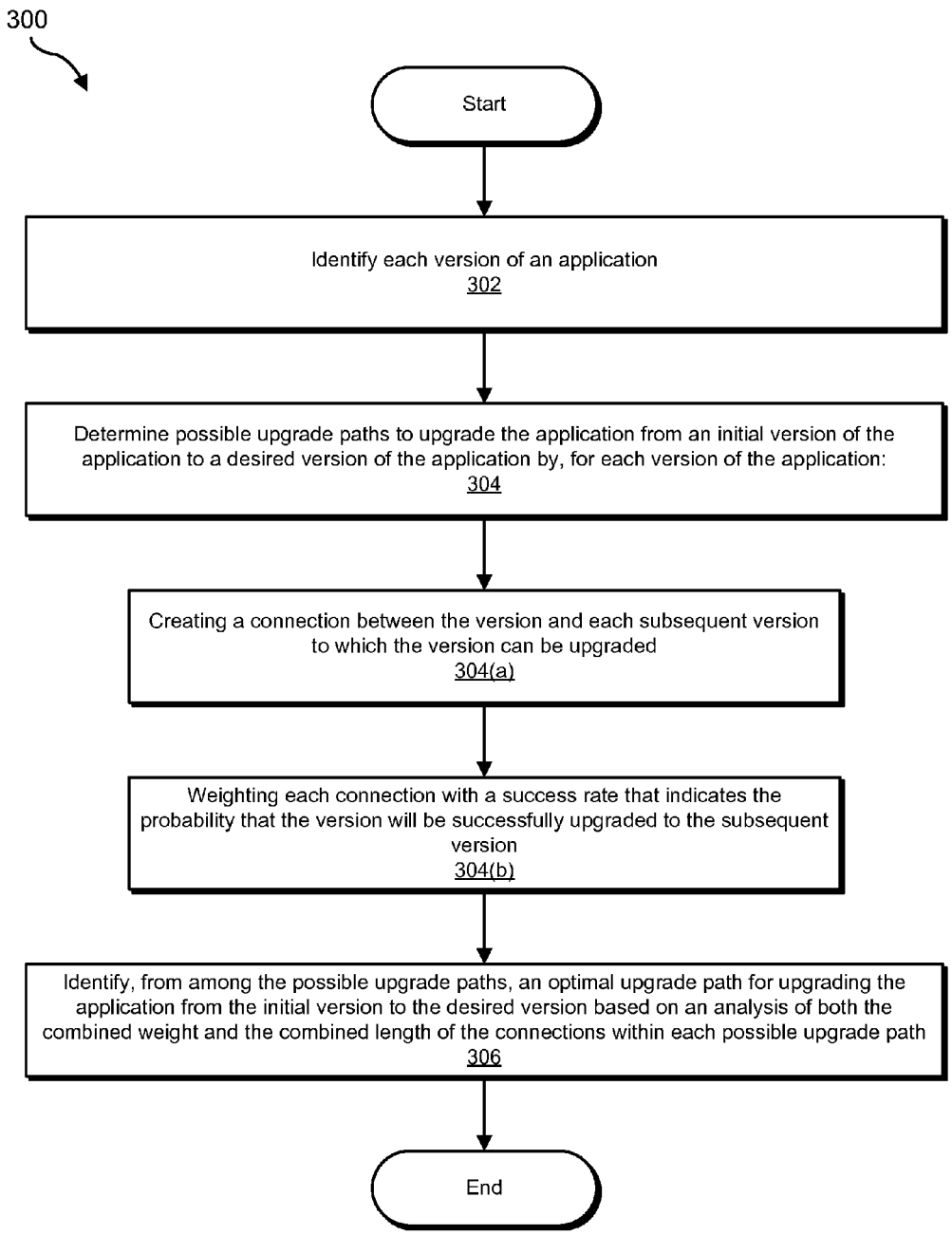
FIG. 3 is a flow diagram of an exemplary method for updating applications.

FIG. 3 is a flow diagram of an exemplary computer-implemented method 300 for updating applications. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 710 in FIG. 7, and/or portions of exemplary network architecture 800 in FIG. 8.

As illustrated in FIG. 3, at step 302 one or more of the systems described herein may identify each version of an application. For example, identification module 104 may, as part of server 206 in FIG. 2, identify application versions 208.

The term "application," as used herein, generally refers to any type or form of software, file, or executable code that may be installed, run, deployed, or otherwise implemented on a computing system. Examples of applications include, without limitation, web browsers, operating systems, communication applications, word and number processing applications, gaming applications, security applications, cloud-based applications, and media applications.

In addition, the term "application version," as used herein, generally refers to any type or form of variant of an application. In some examples, an application version may represent substantially similar functionality as other versions of the same application but may differ in certain features or elements. Furthermore, in some embodiments, an application version may be upgraded to one or more additional application versions.

The systems described herein may identify each version of an application in a variety of ways. In some examples, identification module 104 may identify application versions 208 by searching a database of applications. In other examples, identification module 104 may perform a web search for each version of an application. Additionally or alternatively, identification module 104 may receive user input that indicates application versions 208 and/or determine that a user or computing device is attempting to upgrade an instance of the application.

In some embodiments, identification module 104 may identify each version of an application that has been created. However, in other embodiments, identification module 104 may conserve time and/or computing resources by only identifying versions of an application that are relevant to upgrading a particular version. For example, identification module 104 may only identify versions that have been created subsequently to the particular version. In addition, identification module 104 may only identify versions that exceed a certain threshold of use (e.g., versions that have been downloaded and/or installed more than a specified number of times).

Figure 4:
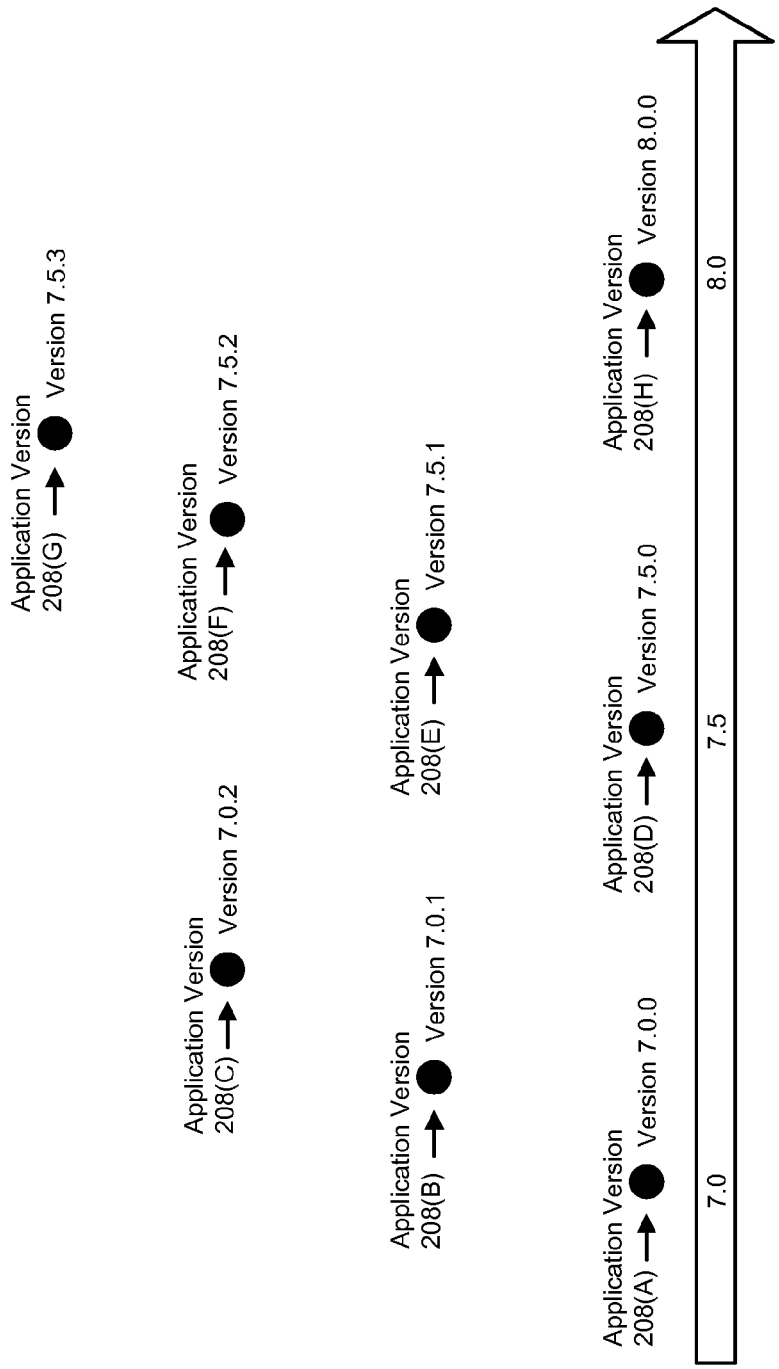
FIG. 4 is an illustration of an exemplary set of application versions.

As an example, FIG. 4 illustrates each of application versions 208. As shown in FIG. 4, application versions 208 may include version 7.0.0, version 7.0.1, version 7.0.2, version 7.5.0, version 7.5.1, version 7.5.2, version 7.5.3, and version 8.0.0, represented as application versions 208(A)-(H).

Returning to FIG. 3, at step 304 one or more of the systems described herein may determine possible upgrade paths to upgrade the application from an initial version of the application to a desired version of the application by, for each version of the application, (1) creating a connection between the version and each subsequent version to which the version can be upgraded and (2) weighting each connection with a success rate that indicates the probability that the version will be successfully upgraded to the subsequent version. For example, determination module 106 may, as part of server 206 in FIG. 2, determine upgrade paths 210.

The systems described herein may determine the possible upgrade paths in a variety of ways. In some examples, determination module 106 may determine upgrade paths 210 by first identifying possible upgrade steps (i.e., an upgrade from one version to another version) within application versions 208. For example, differences between each version may result in errors or incompatibilities when one version is upgraded to one or more other versions. Therefore, determination module 106 may determine which versions do not support upgrades to other versions. In some embodiments, determination module 106 may determine that certain types of upgrade steps (e.g., upgrading to a much higher version or "downgrading" an application to a lower version) are impossible. In addition, determination module 106 may identify particular combinations of applications that are not upgrade-compatible due to structural and/or functional differences between the applications.

Determination module 106 may identify possible upgrade steps in a variety of ways. For example, determination module 106 may analyze application versions 208 to determine possible upgrade steps, receive user input that indicates possible upgrade steps, obtain historical data that indicates the possible upgrade steps, and/or identify the possible upgrade steps in any suitable manner.

Figure 5:
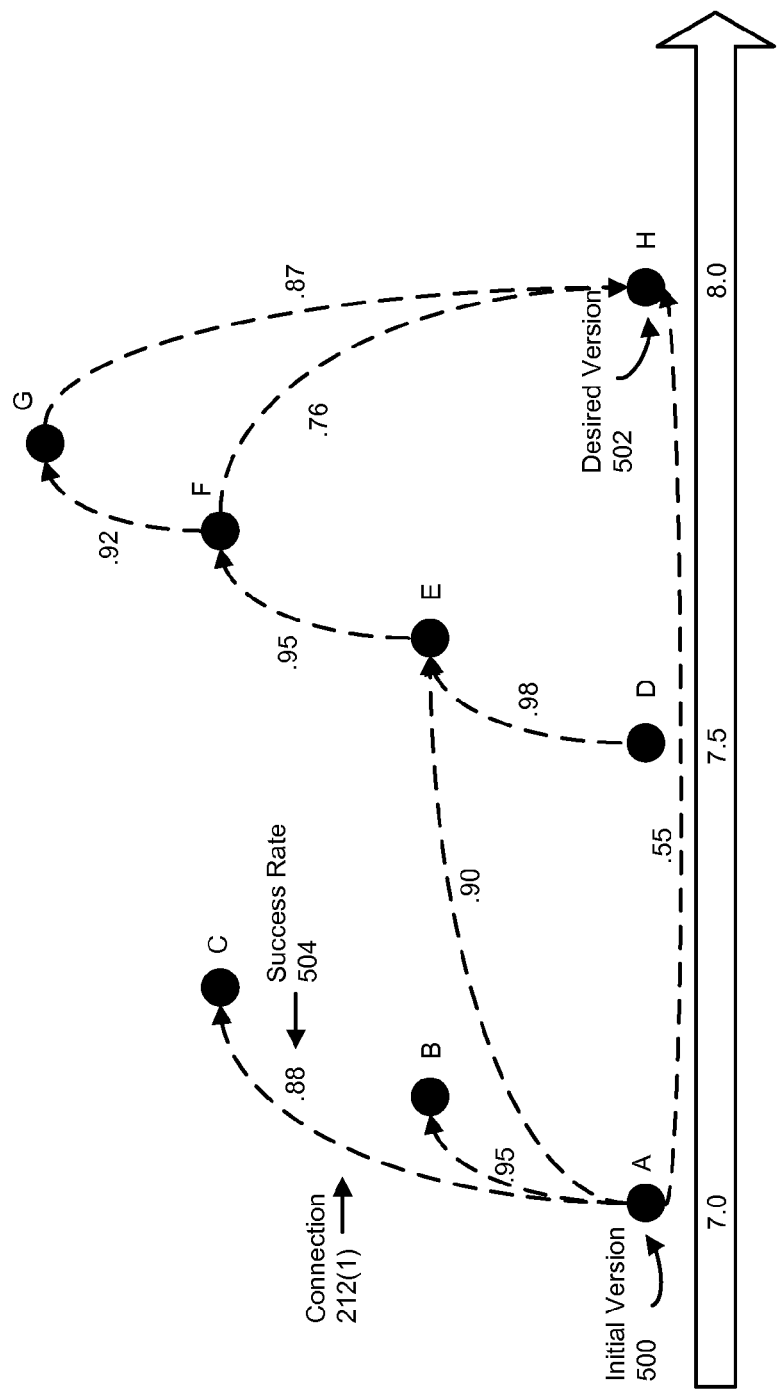
FIG. 5 is an illustration of possible upgrade paths.

In some examples, once determination module 106 has identified a possible upgrade step, determination module 106 may store and/or indicate the upgrade step by creating one of connections 212 between the versions involved in the upgrade step. As an example, FIG. 5 illustrates connections 212 created between application versions 7.0.0-8.0.0 (represented as letters A-H) illustrated in FIG. 4. In some examples, determination module 106 may determine that version A may be upgraded to version C. As a result of that determination, determination module 106 may create connection 212(1) between version A and version C. In addition, determination module 106 may determine that version A can be upgraded to versions B, E, and H, as well as determine each version to which versions B-H can be upgraded. Although not labelled, each dashed arrow in FIG. 4 may represent one of connections 212. Together, connections 212 may represent each possible upgrade step within application versions 208.

Once determination module 106 has identified connections 212, determination module 106 may identify upgrade paths 210 that may be used to upgrade the initial version to the desired version. For example, determination module 106 may identify each series or sequence of upgrade steps that may be applied to the initial version in order to reach the desired version. In some examples, determination module 106 may identify the initial version and the desired version by receiving user input specifying the initial and desired versions and/or by detecting that a user is attempting to upgrade the initial version to the desired version on a computing device (e.g., one of computing devices 202(1)-(N)). In other examples, determination module 106 may identify all possible combinations of initial and desired versions (e.g., in order to improve multiple upgrade paths associated with the application).

Referring again to the example of FIG. 5, version A may represent an initial version 500 and version H may represent a desired version 502. In this example, determination module 106 may identify three separate upgrade paths that may be followed to upgrade version A to version H. FIG. 6 summarizes the upgrade paths identified in FIG. 5. Specifically, upgrade path summaries 600 shows upgrade path 1 (A→H), upgrade path 2 (A→E→F→H), and upgrade path 3 (A→E→F→G→H).

In addition to identifying connections 212 and upgrade paths 210, determination module 106 may weight some or all of connections 212 with a success rate that indicates the probability that the upgrade step represented by the connection will be successful. The term "success rate," as used herein, generally refers to any type or form of measurement, calculation, or prediction that indicates a ratio, percentage, or probability that performing an upgrade step on a computing device will result in a fully-functional version of the application. A success rate may be represented by a fraction, a percentage, a number between zero and one, or any additional numerical representation.

In some examples, a connection may be weighted with a success rate based on the connection representing an upgrade step that is possible in some circumstances but not others. For example, an upgrade step involving two normally compatible versions may not be possible on a computing device that does not have enough storage space to host the higher version and/or on a computing device that does not have one or more required supporting applications installed. In these examples, the success rate may indicate the percentage of computing devices that are capable of supporting the higher version. In other examples, errors or bugs within one or more application versions may make some instances of a particular upgrade step impossible. In these examples, the success rate may indicate the probability that problems within the versions will not interfere with performing the upgrade. In further embodiments, performing an upgrade step may result in a partially-functional version of the application. For example, after the upgrade is completed, some features of the higher version may have impaired functionality, while other features may function as expected. In this example, the success rate may indicate the portion of the higher version expected to be fully-functional after performing the upgrade step. In some examples, determination module 106 may weight connections 212 based on a combination of any of the above-described success metrics and/or any suitable success metric.

Determination module 106 may obtain success rates for connections 212 in a variety of manners. For example, determination module 106 may analyze application versions 208 to predict the success rates. In another example, determination module 106 may obtain the success rates by receiving historical data that indicates the success of performing an upgrade step on at least one computing device (e.g., one of computing devices 202(1)-(N)). In this example, determination module 106 may receive the historical data by triggering the computing device to send the historical data in response to detecting the upgrade. For example, a portion of determination module 106, installed on computing devices 202(1)-(N), may direct one or more of computing devices 202(1)-(N) to identify upgrade steps performed on the computing device. In addition, determination module 106 may determine and report to server 206 the degree to which the upgrade step was successful.

In some examples, computing devices 202(1)-(N) may represent clients or customers of the application to be upgraded. In this way, the systems described herein may determine optimal upgrade paths based on accurate, up-to-date information from actual users.

Furthermore, in some embodiments, determination module 106 may obtain a success rate for each of connections 212. However, in other embodiments, determination module 106 may conserve computing resources by only obtaining success rates for connections within upgrade paths 210. Notably, in some examples, determination module 106 may be unable to obtain success rates for one or more of connections 212. Therefore, in these examples determination module 106 may not assign a success rate to connections 212 or determination module 106 may assign each of connections 212 a success weight of "1".

Referring again to the example of FIG. 5, determination module 106 may weight connection 212(1) between version A and version C with a success rate 504 ("0.88"). In this example, the success rate of 0.88 may indicate that upgrading version A to version C has an 88% chance of resulting in a fully-functional version C. Although not labelled, each number beside the dashed arrows in FIG. 5 may represent the success rate assigned to each connection.

Returning to FIG. 3, at step 306 one or more of the systems described herein may identify, from among the possible upgrade paths, an optimal upgrade path for upgrading the application from the initial version to the desired version based on an analysis of both the combined weight and the combined length of the connections within each possible upgrade path. For example, analysis module 108 may, as part of server 206 in FIG. 2, identify optimal upgrade path 214 from among upgrade paths 210.

The systems described herein may identify the optimal upgrade path in a variety of ways. In some examples, analysis module 108 may analyze each of upgrade paths 210 by accumulating the success rate of each connection within the upgrade path. For example, analysis module 108 may multiply the probabilities used to weight each connection. Specifically, analysis module 108 may implement the formula $E_S = \Pi_{i+1}^n p_i$, where $E_S$ represents the total success rate of an upgrade path, n represents the number of steps within the upgrade path, and $p_i$ represents the success rate of each step.

As an example of the implementation of this formula, upgrade path summaries 600 in FIG. 6 shows the total path success rate for each of upgrade paths 1-3. As shown in FIG. 6, the path success rate for upgrade path 1 (consisting of a single upgrade step) is simply the success rate (i.e., 0.55) assigned to that step. The path success rate for upgrade path 2 may be found by $E_S = (0.90)(0.95)(0.76) = 0.65$. In addition, the path success rate for upgrade path 3 may be found by $E_S = (0.90)(0.95)(0.92)(0.87) = 0.68$. Additionally or alternatively, the total success rate of each upgrade path may be found by summing logarithms of the success rate of each step within the upgrade path.

In some examples, analysis module 108 may identify optimal upgrade path 214 by identifying a possible upgrade path with the largest combined weight. For example, after calculating the total path success rate for each of upgrade paths 210, analysis module 108 may identify optimal upgrade path 214 as the upgrade path with the highest total path success rate. In the example of FIG. 6, analysis module 108 may identify upgrade path 3 as optimal upgrade path 214.

Additionally or alternatively, analysis module 108 may identify the possible upgrade path with the largest combined weight by analyzing upgrade paths 210 using a shortest-path algorithm. The term "shortest-path algorithm," as used herein, generally refers to any type or form of technique, process, or formula that identifies an optimal path between two vertices or nodes in a graph. In some examples, a shortest-path algorithm identifies an optimal path such that the total weight of each edge (or connection between vertices) in the path is minimized. However, as applied to the problem of identifying optimal upgrade path 214, analysis module 108 may implement a shortest-path algorithm that identifies a path that maximizes the total weight of each edge (i.e., using a longest-path algorithm or inverting the success rates assigned to each connection). The formula described above may represent a simple implementation of a shortest-path algorithm. In additional examples, analysis module 108 may analyze upgrade paths 210 using one or more of a variety of shortest-path algorithms, such as Dijkstra's algorithm, a Bellman-Ford algorithm, Johnson's algorithm, or an A* algorithm.

In addition to calculating the combined weight of each of upgrade paths 210, analysis module 108 may identify optimal upgrade path 214 at least in part by calculating the combined length of each possible upgrade path. For example, analysis module 108 may identify the number of connections or steps within each of upgrade paths 210. Notably, in an example where determination module 106 is unable to obtain a success rate for one or more of connections 212 and therefore weights each of connections 212 with a success rate of "1", analysis module 108 may simply identify optimal upgrade path 214 as the shortest possible upgrade path.

Referring again to the example of FIG. 6, upgrade path summaries 600 shows that upgrade path 1 may have a path length of 1, upgrade path 2 may have a path length of 3, and upgrade path 3 may have a path length of 4. As such, analysis module 108 may identify upgrade path 1 as optimal upgrade path 214 based at least in part on upgrade path 1 representing the shortest possible upgrade path.

In some examples, the upgrade path with the largest combined weight may also represent the upgrade path with the shortest combined length. In these examples, analysis module 108 may simply identify that upgrade path as optimal upgrade path 214. However, in other examples (such as the example of FIGS. 5-6), the upgrade path with the largest combined weight may not represent the upgrade path with the shortest combined length. In these examples, optimal upgrade path 214 may not be as readily apparent. Therefore, in some examples, analysis module 108 may most effectively identify optimal upgrade path 214 by identifying an upgrade path that balances its combined weight with its combined length.

Analysis module 108 may analyze both the combined weight and the combined length of upgrade paths 210 in a variety of ways. In one example, analysis module 108 may identify optimal upgrade path 214 as the upgrade path with the largest combined weight that also contains a number of steps under a predetermined threshold (e.g., four steps). Referring to the example of FIG. 6, analysis module 108 may identify upgrade path 2 as optimal upgrade path 214 based on upgrade path 2 having a path length of under four and a higher path success rate than upgrade path 1.

In another embodiment, analysis module 108 may calculate a total numerical measure of the combined weight and combined length of upgrade paths 210. As one example, analysis module 108 may decrease the combined weight of an upgrade path at an amount proportional to the number of steps within the path. As an additional example, analysis module 108 may calculate an average of the combined weight and combined length of each upgrade path (e.g., by first normalizing the combined length and combined length with respect to each other). In general, analysis module 108 may identify optimal upgrade path 214 using a combination of any of the above-described examples and/or any additional analyses.

In addition, in some examples the systems described herein may upgrade the application using optimal upgrade path 214. For example, if determination module 106 identified the initial version of the application on one of computing devices 202(1)-(N), upgrade module 110 may upgrade the application to the desired version on the computing device by following the upgrade steps within optimal upgrade path 214. In some examples, upgrade module 110 may direct a user of the computing device to perform the upgrade steps. In other examples, upgrade module 110 may automatically perform the upgrade steps on the computing device.

The systems described herein may be implemented in a variety of ways and provide a number of advantages. As explained above, by determining the probability of successfully updating versions of an application to subsequent versions, the disclosed systems and methods may identify possible upgrade paths to upgrade an initial version of an application to a desired version. In addition, by analyzing both the total weight and total length of each upgrade path, the described systems and methods may identify an optimal upgrade path that efficiently and successfully upgrades the initial version to the desired version.

Figure 7:
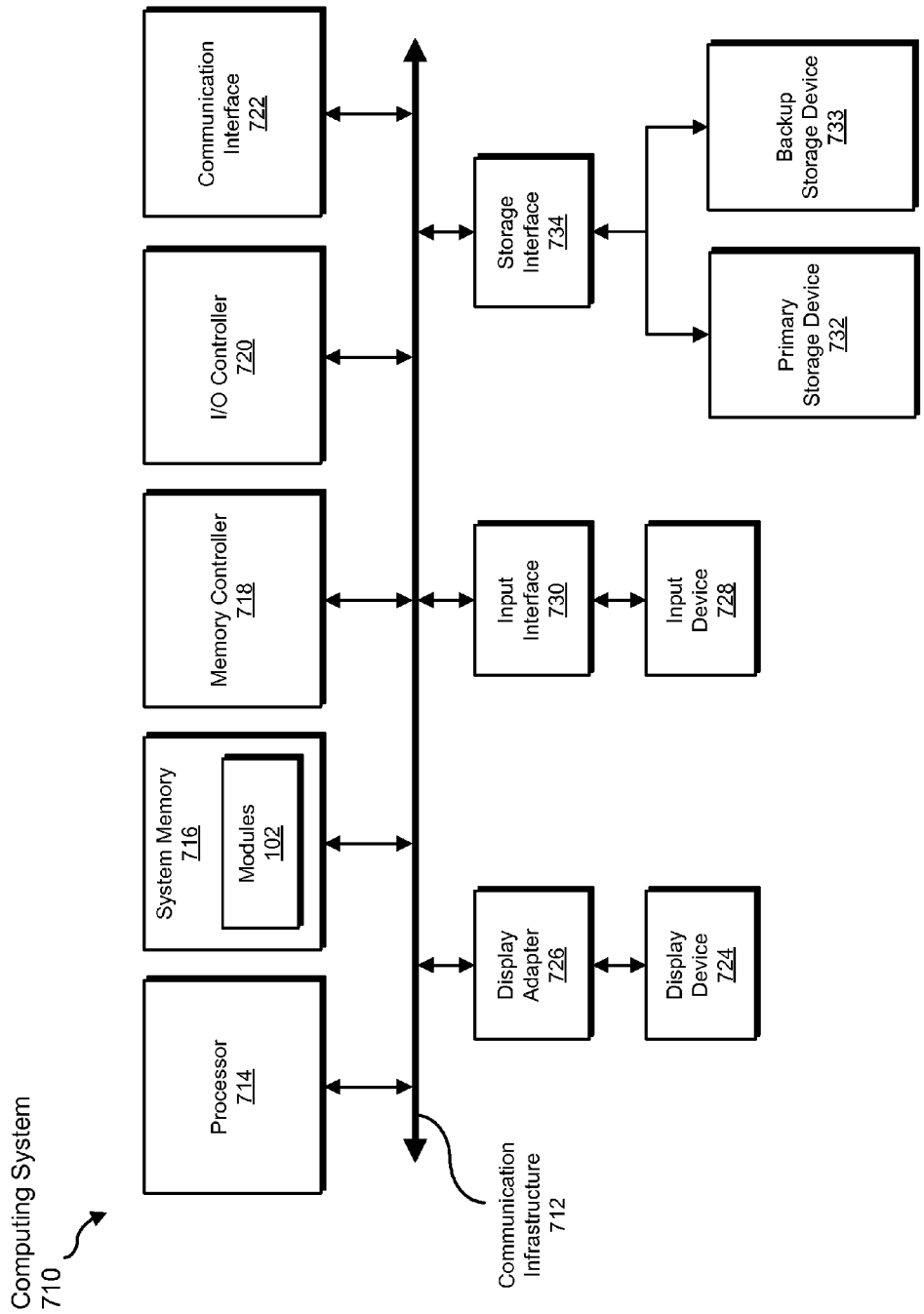
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the exemplary embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an Application Specific Integrated Circuit (ASIC) adapted to implement one or more of the exemplary embodiments disclosed herein.

Figure 8:
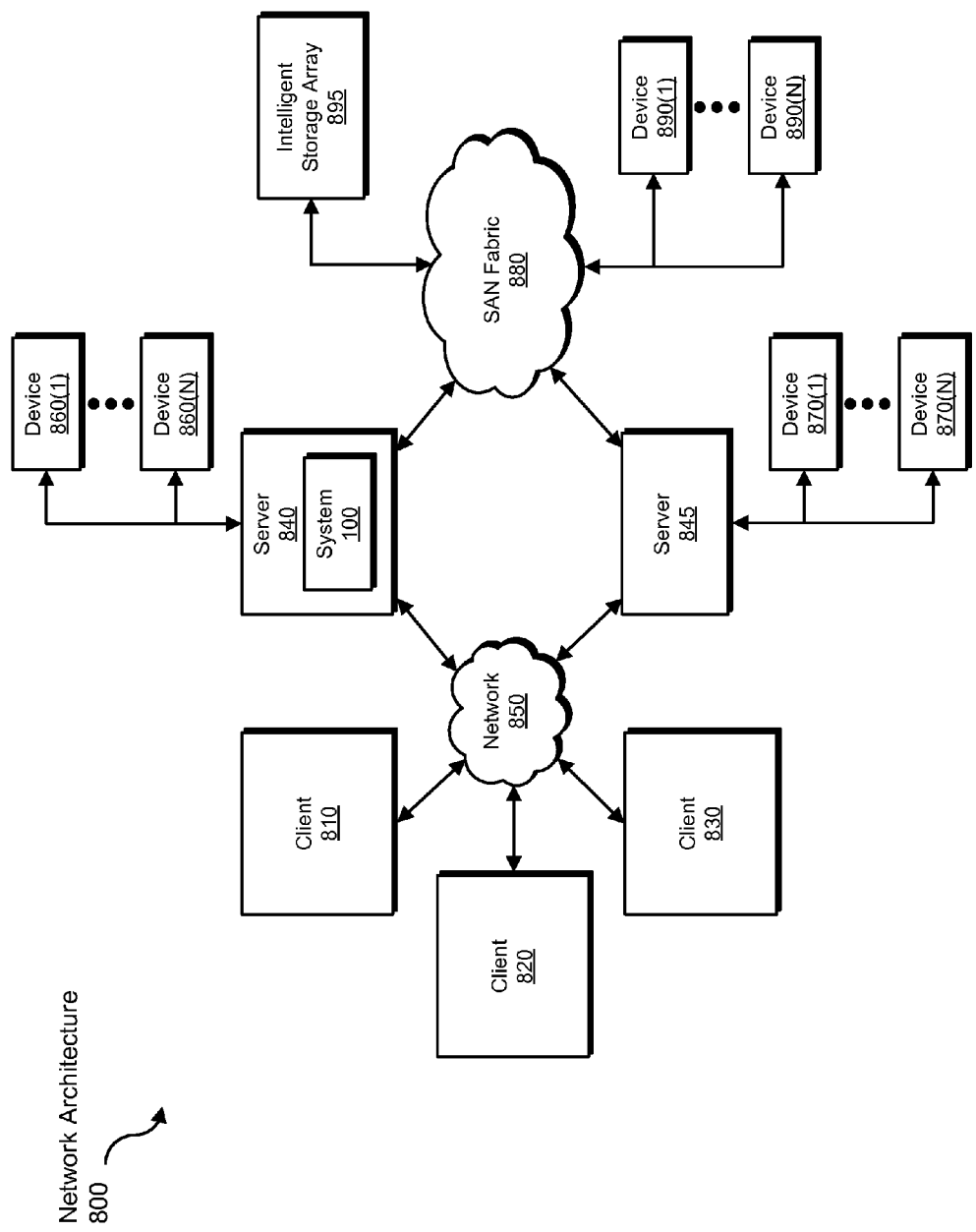
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the instant disclosure.

Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an exemplary method for updating applications.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive information associated with the success rates of upgrading versions of an application, transform the information, store the result of the transformation for analysis, and use result of the transformation to identify an optimal upgrade path. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for updating applications, at least a portion of the method being performed by a computing device comprising at least one processor, the method comprising:
identifying each version of an application;
determining possible upgrade paths to upgrade the application from an initial version of the application to a desired version of the application by, for each version of the application:
creating a connection between the version and each subsequent version to which the version can be upgraded, and
weighting each connection with a success rate that indicates the probability that upgrading the version to the subsequent version will produce a fully-functional version of the subsequent version, wherein the success rate for each connection is obtained by receiving historical data that indicates the success of an attempt to perform the upgrade on at least one additional computing device;
identifying, from among the possible upgrade paths, an optimal upgrade path for upgrading the application from the initial version to the desired version based on an analysis of both the combined weight and the combined length of the connections within each possible upgrade path.

2. The method of claim 1, wherein receiving the historical data comprises triggering the additional computing device to send the historical data in response to detecting the upgrade.

3. The method of claim 1, wherein:
the combined weight of each possible upgrade path is calculated by accumulating the success rate of each connection within the possible upgrade path;
the combined length of each possible upgrade path is calculated by identifying the number of connections within the possible upgrade path.

4. The method of claim 3, wherein accumulating the success rate of each connection within the possible upgrade path comprises at least one of:
multiplying the probabilities used to weight each connection;
summing logarithms of the probabilities used to weight each connection.

5. The method of claim 1, wherein identifying the optimal upgrade path comprises at least one of:
identifying a possible upgrade path with the largest combined weight;
identifying a possible upgrade path with the shortest combined length.

6. The method of claim 1, wherein identifying the optimal upgrade path comprises analyzing the possible upgrade paths using a shortest-path algorithm.

7. The method of claim 1, further comprising, in response to identifying the optimal upgrade path, using the optimal upgrade path to upgrade the application from the initial version to the desired version.

8. A system for updating applications, the system comprising:
an identification module, stored in memory, that identifies each version of an application;
a determination module, stored in memory, that determines possible upgrade paths to upgrade the application from an initial version of the application to a desired version of the application by, for each version of the application:
creating a connection between the version and each subsequent version to which the version can be upgraded, and
weighting each connection with a success rate that indicates the probability that upgrading the version to the subsequent version will produce a fully-functional version of the subsequent version, wherein the success rate for each connection is obtained by receiving historical data that indicates the success of an attempt to perform the upgrade on at least one additional computing device;
an analysis module, stored in memory, that identifies, from among the possible upgrade paths, an optimal upgrade path for upgrading the application from the initial version to the desired version based on an analysis of both the combined weight and the combined length of the connections within each possible upgrade path;
at least one processor that executes the identification module, the determination module, and the analysis module.

9. The system of claim 8, wherein the determination module receives the historical data by triggering the additional computing device to send the historical data in response to detecting the upgrade.

10. The system of claim 8, wherein:
the analysis module calculates the combined weight of each possible upgrade path by accumulating the success rate of each connection within the possible upgrade path;
the analysis module calculates the combined length of each possible upgrade by identifying the number of connections within the possible upgrade path.

11. The system of claim 10, wherein the analysis module accumulates the success rate of each connection within the possible upgrade path by at least one of:
multiplying the probabilities used to weight each connection;
summing logarithms of the probabilities used to weight each connection.

12. The system of claim 8, wherein the analysis module identifies the optimal upgrade path by at least one of:
identifying a possible upgrade path with the largest combined weight;
identifying a possible upgrade path with the shortest combined length.

13. The system of claim 8, wherein the analysis module identifies the optimal upgrade path by analyzing the possible upgrade paths using a shortest-path algorithm.

14. The system of claim 8, further comprising, in response to the analysis module identifying the optimal upgrade path, an upgrade module uses the optimal upgrade path to upgrade the application from the initial version to the desired version.

15. A non-transitory computer-readable medium comprising one or more computer-executable instructions that, when executed by at least one processor of a computing device, cause the computing device to:
identify each version of an application;
determine possible upgrade paths to upgrade the application from an initial version of the application to a desired version of the application by, for each version of the application:
creating a connection between the version and each subsequent version to which the version can be upgraded, and
weighting each connection with a success rate that indicates the probability that upgrading the version to the subsequent version will produce a fully-functional version of the subsequent version, wherein the success rate for each connection is obtained by receiving historical data that indicates the success of an attempt to perform the upgrade on at least one additional computing device;

identify, from among the possible upgrade paths, an optimal upgrade path for upgrading the application from the initial version to the desired version based on an analysis of both the combined weight and the combined length of the connections within each possible upgrade path.

16. The computer-readable medium of claim 15, wherein the computer-executable instructions further cause the computing device to:

calculate the combined weight of each possible upgrade path by accumulating the success rate of each connection within the possible upgrade path;

calculate the combined length of each possible upgrade path by identifying the number of connections within the possible upgrade path.

17. The computer-readable medium of claim 15, wherein the computer-executable instructions further cause the computing device to identify the optimal upgrade path by at least one of:

identifying a possible upgrade path with the largest combined weight;

identifying a possible upgrade path with the shortest combined length.

* * * * *